Jan. 15, 1963 C. W. BEMMELS 3,073,734
ADHESIVE TAPES
Filed April 6, 1959
Fig. 1.
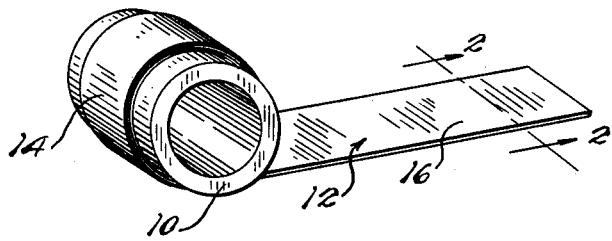
Fig. 2.
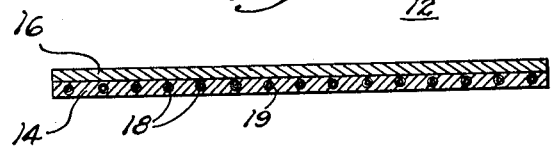
Fig. 3.
Fig. 4.
Fig. 5.
INVENTOR.
Cyrus W. Bemmels
BY
Olson, Mecklenburger, van Holst,
Pendleton, Neuman.

United States Patent Office 3,073,734
Patented Jan. 15, 1963

3,073,734
ADHESIVE TAPES
Cyrus W. Bemmels, New Brunswick, N.J., assignor to Johnson & Johnson, a corporation of New Jersey
Filed Apr. 6, 1959, Ser. No. 804,404
6 Claims. (Cl. 154—53.5)

This invention relates to strand reinforced tapes and more particularly to strand reinforced tapes of the normally tacky and pressure-sentitive type. This application is a continuation-in-part of my copending application Serial No. 449,711, filed August 13, 1954, now abandoned.

There are certain characteristics which are desirable in all such tapes and depending upon the use to which the tape will be put, one particular characteristic is enhanced and emphasized, generally to the detriment of the others. For example, in many applications such as packaging, and particularly bundling of heavy or bulky articles, strength has been considered the critical attribute, and this quality has been improved, generally by increasing the gauge of the backing or the number of laminations of the backing, thereby producing a bulky tape lacking flexibility and being generally unaesthetic. In other uses, the appearance is of prime importance, and strength is sacrified to attain attractive surface ornamentation. In such tapes, the adhesive mass is generally very thin, and the backing of light gauge, frequently either transparent, colored or printed in an attractive manner. In a third circumstance, flexibility of the tape and its ability to conform to odd shapes may be of great importance. This occurs when an odd shape is to be bound, such as may occur in industrial packaging or in wrapping cable ends. In both of the latter uses, strength is of importance and is partially sacrified only to attain the other required characteristics.

The construction of reinforced pressure-sensitive tape preferably includes a flexible backing which readily transmits the pressure applied to one surface thereof to bring an adhesive coating applied to the opposite surface into intimate contact with the surface to be adhered to. A stiff backing is frequently responsible for insufficient adhesion and insufficient conformance of the tape to the contours and interstices of the joined surfaces.

To overcome the weakness of some prior adhesive tapes, attempts have been made to increase the tensile strength of the tape by increasing the gauge of the backing. This produces a stronger tape which may, however, be too bulky and stiff to adequately adhere to the desired surfaces. In tapes of the prior art which rely upon a thick backing material for strength, backing thickness and strength are directly related and substantially proportional. However, where such tapes employ pressure-sensitive adhesives, the flexibility, and consequently the adhesion to supporting surfaces, decrease very rapidly with increased thickness in a generally exponential relationship.

It is, therefore, an important object of this invention to provide an improved pressure-sensitive adhesive tape having increased strength.

It is another object of this invention to provide an improved adhesive tape having increased strength and flexibility.

It is a further object of this invention to provide an improved adhesive tape wherein a given thickness of backing material will possess increased strength and flexibility.

Another object of this invention is the provision of an improved strand reinforced adhesive tape of increased strength and flexibility requiring a reduced weight of pressure-sensitive adhesive for a unit area of tape.

It is still another object of this invention to provide an improved strand reinforced pressure-sensitive tape in which the strands are secured in a flexible pliable backing material and are not subject to inadvertent transverse shifting or removal.

It is still another object of this invention to provide an improved strand reinforced pressure-sensitive tape which may be produced in either transparent, translucent or opaque form having any desired coloring or surface ornamentation.

It is still another object of this invention to provide a very strong thin pressure-sensitive tape having a plurality of strands supported in spaced generally parallel relationship in a supporting film, the tape being quite flexible, though strong, and readily conformable to irregular objects and capable of adhering readily to supsupporting surfaces with only the application of finger pressure.

Further and additional objects of this invention will become manifest from a consideration of this description, the accompanying drawings, and the appended claims.

In one form of this invention an adhesive tape is provided comprising a plurality of relatively strong spaced strands, a supporting film or backing element substantially surrounding said strands and maintaining the strands in their respective positions, and a normally tacky pressure-sensitive adhesive coating on said backing element. More particularly, an adhesive tape is provided in which a plurality of individual isolated strands of relatively great tensile strength are disposed longitudinally of a formable backing element and secured therein. The strands are surrounded by the pliable backing in such a manner that transverse movement or removal of the strands is substantially prevented although limited longitudinal movement of the strands relative to one another or relative to the backing may be permitted. This limited longitudinal movement may be the result of the elasticity or yieldability of the backing material, as will be clear from the description to follow. A relatively thin film of a normally tacky pressure-sensitive adhesive is applied to one surface of the reinforced backing element, and the limited longitudinal yieldability of the normal tacky pressure-sensitive adhesive may contribute to the limited longitudinal freedom of the strand material. The resulting tape is generally packaged as a long, relatively narrow strip wound in roll form.

For a more complete understanding of this invention reference will now be made to the accompanying drawing wherein:

FIG. 1 is a perspective view of a roll of tape incorporating the teaching of this invention;

FIG. 2 is an enlarged transverse sectional view of the tape shown in FIG. 1 taken on the line 2—2 thereof;

FIG. 3 is an enlarged transverse sectional view of an alternate embodiment of the invention wherein the strands are disposed in a bonding coating;

FIG. 4 is an enlarged transverse sectional view of the partially assembled components of a third embodiment of this invention; and FIG. 5 is an enlarged transverse sectional view of the embodiment of FIG. 4 with a coating of adhesive material applied thereto.

It should be clearly understood that the figures of the drawing are more or less diagrammatic in form to better illustrate the application of the principles involved. The dimensions and proportions in the figures are selected to clearly define the various elements of the structures and may vary substantially from those shown when incorporated into particular commercial products.

Referring now to the drawing, and more particularly to FIG. 1, a cylindrical roll 10 is illustrated on which is wound an elongate tape 12 having a flexible backing with a normally tacky pressure-sensitive adhesive 16 deposited thereon. The backing comprises a plurality of individually isolated, longitudinally extending strands 18 of relatively strong material surrounded and interconnected by a thin pliable backing film or backing element 14.

The transverse section of FIG. 2 clearly illustrates the relative disposition of the flexible backing 14, the adhesive coating 16, and the plurality of strands 18. As shown therein, the strands 18 are centrally disposed within and surrounded by the backing element 14 which comprises one preferred form of the invention. However, it is within the scope of the invention to embed the strands in the backing element adjacent to either one of the outer surfaces of said element or extending partially beyond the surface of the element. It is further contemplated that the strands 18 may be distributed in a random manner throughout the backing 14 provided only that they be spaced apart from each other and uniformly distributed over the tape width and that they extend longitudinally of the tape. In all embodiments similar to that shown in FIG. 2 the strands 18 are secured in the backing element 14 preferably as a result of a portion of the element filling the interstices of the strand material or surrounding the strands while the backing is in a plastic or fluid state during formation of the tape backing. If desired, additives such as a softener or plasticizer may be included in the backing material to insure the desired elasticity of the product. If desired or required in certain embodiments, the strands 18 may be individually treated prior to incorporation into the backing whereby the desired adherence is produced therebetween. Any one of a plurality of known sizing materials may be used to provide a coating 19 on the strands and aid in bonding them to the backing.

An alternate embodiment 20 is illustrated in FIG. 3. Therein two thin sheets are disposed in overlying relationship with a layer of a bonding coating containing a plurality of longitudinally aligned spaced strands disposed therebetween. As shown in FIG. 3, the strands 22 are substantially surrounded by the bonding coating 24 which tenaciously adheres to each of the sheets 26 and 28. The bonding material is yieldable or elastic in nature whereby any tensile forces longitudinally applied to the tape will be distributed among the various stands and also along the length of any given strand.

One preferred tape constructed according to the description above uses the same material for both the films 26 and 28 and the bonding coating 24. Such a construction is manufactured by disposing the strands 22 between two backing films and surrounding the strands with a solution of the backing material and a volatile solvent. By driving off the solvent, an integral assembly is formed in which the films and bonding coating are of an identical material. It will be understood that the various methods of construction will occur to one skilled in the art and that all such techniques fall within the teaching of this invention if the result is an adhesive tape having increased strength and flexibility generally produced by a structure comprising a plurality of longitudinal strands embedded in and substantially surrounded by a backing element.

A third embodiment 32 of the invention is illustrated in FIGS. 4 and 5. The tape 32 is shown partially assembled in FIG. 4 and in complete form in FIG. 5. The tape backing is constructed as shown in FIG. 4, said backing comprising two thin sheets 34 and 36 with a plurality of spaced strands 38 extending longitudinally along the length of the tape between the sheets 34 and 36. During the initial assembling of the backing element, the spaces between the strands and the films are not filled with any material. Upon application of heat and pressure, the backing sheets 34 and 36 become plastic and are forced inwardly to fuse together to effectively form a single element. The application of heat and pressure also causes the sheet material to adhere to the strands 38 and to penetrate the strands and at least partially fill the spaces between the individual filaments which comprise the strands.

An adhesive coating 40 is applied to either surface of the integral backing element to form a complete tape 32, as shown in FIG. 5. In this embodiment, as in the embodiment of FIGURE 1, the backing material should be one possessing at least a modicum of elasticity or yieldability to assure the balanced effect described above whereby tensile forces are distributed among the various strands and along the length of each individual strand.

In all the various constructions described, the adhesive film is deposited on one surface of the assembled tape construction in a conventional manner.

The backing sheets employed in any of the structures described above may be of a wide variety of materials, but important advantages are realized in using films which can be rendered fluid or plastic under predetermined conditions. The backing materials which may be used include ethyl cellulose film, cellulose acetate, cellulose acetate butyrate, cellulose propionate, polymers and copolymers of polyvinylidene chloride, vinyl chloride, and/or acrylonitrile, polyethylene, vinyl chloride polymers such as polymers of vinyl chloride and vinyl acetate, superpolyamides of the nylon type, e.g., the polymers of styrene and isobutylene, benzyl cellulose, flexible acrylates and methacrylates, rubber films, chlorinated rubber, cyclized rubber, rubber hydrochloride, polyvinyl acetal and polyvinylbutyral. As is well known in the art, certain of the above materials may be compatibly mixed to produce additional compositions having desirable physical characteristics. In the two sheet construction of FIGS. 4 and 5 a fibrous sheet, either woven or nonwoven may be employed. For example, a paper web unified with latex functions satisfactorily.

The backing material should have a thickness sufficient to surround the longitudinal strands and maintain the strands in longitudinally spaced relationship in the form of an integral sheet or strip. However, as the strands contribute substantially all of the tensile strength when interconnected by the pliable film to permit limited longitudinal movement, the backing element should have a thickness no greater than that necessary to support the strands, receive the pressure sensitive adhesive and permit the tape to be wound in roll form and unwound without delamination or other damage. The precise maximum acceptable backing depends in part upon the nature and pliablity of the material. However, the stiffness of such backings has been found to increase at a generally exponential rate for increases in thickness, and the ability of a pressure-sensitive adhesive tape to adhere to a surface under hand or finger pressure has been found to be directly related to stiffness.

The preferred strands are composed of glass, but any other strands having high tensile strength may be substituted therefor. For example, either spun strands, thin filaments of substantial length collected together, either twisted or nontwisted, or monofilaments of various synthetic materials may be employed. Cellulose acetate, cellulose propionate or other cellulose esters, superpolyamides of the nylon type, rayon, vinylidene chloride interpolymers, cotton threads, linen threads or silk threads may be used. The term "strands" is used in a broad sense herein to include all elongated elements having the desired characteristics whether said elements be twisted, braided, multi- or mono-filaments, rope-like assemblies or wire. Strands having a twist imparted thereto are somewhat preferred as such strands are easier to anchor in the backing and produce a strong ultimate product. The strand material selected for use with any given backing material should not be one which will fuse with the material or dissolve in a backing solvent, if one is employed in the construction of the assembly. If the materials are assembled under heat and pressure, the strand material must remain in the solid state during formation of the tape. It is one desideratum that the strands remain entities capable of slight independent longitudinal movement relative to the adjacent strands whereby distribution of the tensile forces may be made between the various strands through the flexible and somewhat elastic base.

If a bonding coating is employed between the two sheets which form the backing, as is illustrated in FIG. 3, said coating may be any of the materials designated above for use as backing material or may be any one of a group of elastic adhesive materials. Best suited for this purpose, however, are the copolymers of butadiene and styrene, natural rubber, interpolymers of butadiene with acrylonitrile, methacrylonitrile, methyl acrylate, methyl methcrylate, ethyl methacrylate and other acrylic compounds wherein the acrylic group comprises a large proportion by weight of the molecules.

The adhesive coating may be any one of many familiar adhesives which are rubbery, normally tacky and pressure-sensitive. For best results the adhesive coating is spread on the backing to a dry coating weight of 0.5 to 5 ounces per square yard. However, this range is recited merely as a suggested working range and other values may be substituted therefor under certain conditions.

Typical backing, bonding and adhesive materials are recited hereinafter, these typical specific materials being within the general classes defined above. The proportions of all constituents of the various examples hereinafter listed are in terms of parts by weight, unless otherwise specified.

BACKINGS

Backing A

| | Parts |
|---|---|
| Polyvinyl chloride (8–10 microns mean dia.), specific viscosity 0.24 | 100 |
| Dibutyl phthalate | 30 |
| Polypropylene glycol sebacate (molecular weight approx. 8,000, acid number 2.0 max.) | 30 |
| Basic lead carbonate | 2 |
| Xylol | 15 |

Backing B

| | |
|---|---|
| Vinylidene chloride acrylonitrile copolymer, 6.4 mole ratio _____parts__ | 80 |
| Viscosity of 20% solids in MEK _____cps__ | 1,000 |
| Tricresyl phosphate _____parts__ | 20 |
| Lead stearate _____do__ | 2 |

BONDING COATINGS

Bonding Coating A

| | |
|---|---|
| 75 butadiene-25 acrylonitrile copolymer (85 Mooney) | 100 |
| Thermosetting pure phenol-formaldehyde resin (M.P. 70–75° C.) | 50 |
| Stalite—mixture of mono and di-heptyl diphenylamines | 2 |
| Toluene | 400 |

Bonding Coating B

| | |
|---|---|
| Pale crepe (well milled) | 100 |
| Methylenebis (phenyl) diisocyanate | 40 |
| Heptane | 600 |

ADHESIVE COATINGS

Adhesive Coating A

| | |
|---|---|
| Pale crepe | 100 |
| Aluminum hydrate | 60 |
| Polyterpene resin (M.P. 70° C.) | 30 |
| Polyterpene resin (M.P. 115° C.) | 30 |
| Lanolin | 10 |
| Normal antioxidant | 1 |

Adhesive Coating B

| | Parts |
|---|---|
| Pure gum reclaim rubber (83.3% rubber hydrocarbon) | 120 |
| Zinc oxide | 70 |
| Polyterpene resin (M.P. 70° C.) | 80 |
| Rubber plasticizer consisting of a heavy clear liquid composed of high molecular weight hydrocarbons | 20 |
| Normal antioxidant | 2 |

Adhesive Coating C

| | |
|---|---|
| 75 butadiene-25 styrene (70 Mooney) | 50 |
| Polyisobutylene (100,000 molecular weight) | 50 |
| Glycerol ester of hydrogenated rosin (M.P. 84° C.) | 55 |
| Polyisobutylene (1100 molecular weight) | 5 |

Adhesive Coating D

| | |
|---|---|
| Polyvinyl ethyl ether—amorphous—intrinsic viscosity 2.37 | 100 |
| Hydrogenated rosin (M.P. 76° C.) | 5 |
| Normal antioxidant | 0.4 |

Adhesive Coating E

| | |
|---|---|
| Pale crepe | 60 |
| 71 butadiene-29 styrene copolymer (50 Mooney) | 40 |
| Zinc oxide | 100 |
| Polyterpene resin (M.P. 115° C.) | 50 |
| Coumarone-indene resin (M.P. 110–135° C.) | 30 |
| Lanolin | 10 |

The above listed and other typical materials have been organized into the following combinations to produce desirable tapes having high tensile strength, light weight, and good flexibility. Wherever values are stated for tensile strength, those values represent the tension in pounds per inch of tape width which will produce failure of the tape. Where adhesion is mentioned hereinafter, the values represent the force, in ounces, per inch of tape width, which must be applied to the free end of a tape length which is secured to a clean steel plate in order to peel the tape back upon itself and free it from the plate (ASTMD–1000). Any values stated for stiffness are in milligrams and are measured in terms of the Gurley stiffness system.

I

Backing A is cast and fused into a tape construction as illustrated in FIG. 2 having a weight or thickness of 7.0 ounces per square yard with 100 isolated strands of 120 filament, 300 denier viscose rayon extending longitudinally therethrough for each inch of tape width, the rayon strands having 2.5 turns per inch of twist. Adhesive coating A is secured to one surface of the tape thus formed, the mass weight of the adhesive coating being 3.0 ounces per square yard. A tape constructed in accordance with this specification exhibits a tensile strength of 200 lbs. per inch of tape width and is .013 inch thick.

II

Backing A is cast and fused into a tape construction as illustrated in FIG. 2 having a weight of 6.0 ounces per square yard into which 45 isolated strands of glass are embedded for each inch of tape width, the glass being of type 150 1/0 and 305 denier. Adhesive coating B is applied to a surface of the resulting tape with a mass weight of 2.0 ounces per square yard. The resulting tape has a tensile strength of 190 pounds per inch of tape width and a thickness of .01 inch.

III

A polyethylene backing is extruded to form a tape as shown in FIG. 2 having a weight of 5.0 ounces per square yard, 50 strands of 300 denier viscose rayon being embedded in each inch of backing width. The strands are each composed of 44 filaments having a twist therein of 6 turns per inch. The strands prior to bonding are individually sized with bonding coating B. Adhesive coating C is applied with a mass weight of 1.5 ounces per square yard. The resulting tape has a tensile strength of 90 pounds per inch of tape width and has a thickness of .009 inch.

IV

Backing B is calendered to form a tape as shown in FIG. 2 having a thickness of 4.0 ounces per square yard with 10 strands of 200 denier nylon extending longitudinally through each inch of tape width. Each strand of nylon comprises 34 filaments having a twist of 1 turn per inch. Bonding coating A is applied to the individual strands prior to the formation of the reinforced backing. 1.0 ounce per square yard of adhesive coating D is applied thereover. The resulting tape has a thickness of .006 inch and a tensile strength of 20 pounds per inch of tape width.

V

A backing comprising two films of polyethylene terephthalate, known as Mylar, each having a thickness of .0005 inch are placed in overlying relationship with a layer of 100 denier nylon strands longitudinally disposed therebetween to form a tape as illustrated in FIG. 3. 150 strands are disposed between the films in each inch of tape width and the remaining area between the films is filled with a bonding coating of material A having a weight of 2.5 ounces per square yard. Each strand comprises 34 filaments with a twist of 1 turn per inch. A 1-ounce per square yard coating of adhesive E is applied to one surface of the backing. The resulting tape has a tensile strength of 150 pounds per inch of tape width and a thickness of .007 inch.

VI

A polyethylene backing is extruded to form a tape as shown in FIG. 2 having a backing thickness of .0055 inch in which 24 isolated strands of glass are embedded for each inch of tape width, the glass strands being of type 150 1/0. An adhesive coating comprising a mixture of pale crepe rubber and commercially known Vistanex B-100 (a median molecular weight polyisobutylene) is calender coated on the tape with a mass weight of 3.0 ounces per square yard. The resulting tape has a tensile strength of 125 pounds per inch of tape width, a stiffness of 118 milligrams, adhesion to steel of 68–70 ounces, an elongation of 5%, and a total thickness of .0085 inch.

VII

A polyethylene backing is extruded to form a tape as shown in FIG. 2 having a backing thickness of .0058 inch in which 24 isolated strands of nylon are embedded for each inch of tape width, the nylon strands being of 210 denier. A pale crepe adhesive coating similar to coating A and commercially known as Vistanex B-100 is calender coated on the tape with a mass weight of 0.2 ounces per square yard. The resulting tape has a tensile strength of 90 pounds per inch of tape width, a stiffness of 40.5 milligrams, adhesion to steel of 80 ounces, an elongation of 25%, and a total thickness of .0078 inch.

VIII

A polyethylene backing is extruded to form a tape as shown in FIG. 2 having a backing thickness of .007 inch in which 24 isolated strands of glass are embedded for each inch of tape width, the glass strands being of type 75 1/0. An adhesive coating comprising a mixture of pale crepe rubber and commercially known as Vistanex B-100 (a median molecular weight polyisobutylene) is calender coated on the tape with a mass weight of 2.0 ounces per square yard. The resulting tape has a tensile strength of 212 pounds per inch of tape width, a stiffness of 225 milligrams, adhesion to steel of 26–30 ounces, an elongation of 3%, and a total thickness of .009 inch.

As already described it is important in this invention that the backing film or element have sufficient thickness and stiffness to surround the strands, maintain the strands in the spaced longitudinal relationship within the tape, and provide means by which the tensile forces in the strands may be distributed substantially uniformly among the various strands. It is equally important that the backing element be sufficiently thin and pliable to properly distribute those forces, to readily transmit hand pressure and firmly adhere the tape to a surface, and to permit close conformance of the tape to irregular shape and the interstices of relatively smooth surfaces to obtain intimate adhesion thereto.

The following further Examples IX, X and XI establish these important relationships. While Example IX comprises a satisfactory reinforced pressure sensitive tape, Examples X and XI would lack sufficient pliability and adhesion and thus would not fall within the scope of this invention.

IX

A polyethylene backing is extruded to form a tape as shown in FIG. 2 having a backing thickness of .013 inch in which 24 isolated strands of glass are embedded for each inch of tape width, the glass strands being of type 150 1/0. A pressure-sensitive adhesive of a crude rubber base is coated on the tape with a mass weight of 2.0 ounces per square yard. The resulting tape has a tensile strength of 127.5 pounds per inch of tape width, a stiffness of 677 milligrams, adhesion to steel of 50 ounces, and a total thickness of .015 inch.

X

A polyethylene backing is extruded to form a tape as shown in FIG. 2 having a backing thickness of .030 inch in which 24 isolated strands of glass are embedded for each inch of tape width, the glass strands being of type 150 1/0. A pressure-sensitive adhesive of a crude rubber base is coated on the tape with a mass weight of 2.0 ounces per square yard. The resulting tape has a tensile strength of 140 pounds per inch of tape width, a stiffness of 2,753 milligrams, adhesion to steel of 2.0 ounces and a total thickness of .032 inch.

XI

A polyethylene backing is extruded to form a tape as shown in FIG. 2 having a backing thickness of .052 inch in which 24 isolated strands of glass are embedded for each inch of tape width, the glass strands being of type 150 1/0. A pressure-sensitive adhesive of a crude rubber base is coated on the tape with a mass weight of 2.0 ounces per square yard. The resulting tape has a tensile strength of 140 pounds per inch of tape width, a stiffness of 14,200 milligrams, adhesion to steel of 1.0 ounces, and a total thickness of .054 inch.

In each of the Examples IX, X and XI, one surface of the polyethylene was flame treated and a prime coating of about 0.1 ounce per square yard applied thereto prior to the application of the pressure-sensitive adhesive.

Examples I through IV show the unusual characteristics of flexibility, tensile strength and adhesion obtainable when following the teaching of this invention, while Examples X and XI are illustrative of the detrimental effects of a departure from the structures set forth herein. These examples constitute unsatisfactory pressure-sensitive tapes in that they are stiff and lack sufficient adherence to associated surfaces. As already described, the backing serves only to surround and support the strands and to support the adhesive and independently contributes little to the strength of the resulting tape.

In order to provide tapes with the physical characteristics set forth above, it has been found that the backing thickness when using the various materials set forth above should be at least about .005 inch thick to insure enclosure and support of the strands without delamination and up to about .020 inch in thickness to insure sufficient pliability to form a satisfactory pressure sensitive tape. When a plasticizer has been added to render the backing material excessively pliable, thickness up to about .025 inch will in some instances produce satisfactory pressure-sensitive tapes. In some instances a tape having a backing in the range of .005 inch may have surfaces which are somewhat irregular. Where it is desirable to provide a tape requiring the minimum amount of adhesive and having smooth surfaces, somewhat thicker backing in the order of .008 inch or greater should be employed.

From the examples above described it will be clear that a tape is produced by this invention which has greater strength per unit width and thickness than tapes heretofore generally known. In addition to the increased strength thus provided, a thinner tape having increased flexibility may be produced which possesses high tensile strength. Thus the tapes are characterized by improved adhesion under hand applied pressure. With the reinforcing strands disposed within the backing, a thinner layer of adhesive coating may be employed reducing any tendency toward edge exudation which, under certain circumstances, may be objectionable and unaesthetic. The backing film and strands may be selected to have similar light transmitting and refracting characteristics so that an attractive transparent tape may be produced. In the alternative, the tape may be produced in various attractive colors. The strength of the tape provided by this invention is great in the longitudinal direction while the tensile strength in the transverse direction is about the same as the tensile strength of the backing material.

Several methods of manufacture have been generally mentioned above and many more techniques will occur to one skilled in the art.

For example, a plurality of threads in spaced relationship may be passed through the nip of a calender along with a thermoplastic film. The threads are preferably aligned in parallel relationship by passing through a comb. Heat and pressure are applied to the film and overlying threads or strands causing the strands to become embedded in the film. In the alternative, the film may be calendered directly onto the aligned threads in a manner similar to calendering cloth.

The backing may be cast by laying the spaced longitudinal threads on a carrier and casting a film over and around the threads. The casting may be made either from a dissolved resin, or from latex, or from an organisol or plastisol and will be processed by drying and/or fusing of the material depending upon the state of the ingredients. Alternately, the film may be cast first, and the threads embedded in the film while the film remains in a plastic or wet state.

A very thin film may be coated with a bonding coat, threads subsequently embedded in the bonding coating and a second film applied to the other surface of the bonding coat to provide an integral construction in which the threads are embedded between two thin films and are firmly attached thereto by the suitable bonding coat. The bonding coating may be the same material as the films, or may be omitted, and the films fused together to enclose the strands. The latter generally requires the use of a somewhat heavier gauge of backing film. A primer may be desired to produce better adherence between the coatings and the backing. If desired, any one of various primers such as those described in my Patent No. 2,647,843 may be used.

The adhesive coating may be applied by any standard method such as calender coating or solvent or dispersion coating, by knife, or reverse roller coating.

While particular examples have been recited herein to enable an artisan to construct a tape having the desired physical characteristics of high tensile strength, good flexibility and tenacity, and attractive appearance, it will be understood that the benefits to be gained from the broad teaching of this invention will be available in other structures, many of which are clearly suggested in this disclosure.

Without further elaboration, the foregoing will so fully explain the character of my invention that others may by applying current knowledge, readily adapt the same for use under varying conditions of service, while retaining certain features which may properly be said to constitute the essential items of novelty involved, which items are intended to be defined and secured to me by the following claims.

I claim:

1. A pressure-sensitive adhesive tape for application to supporting surfaces comprising an elongate thin pliable and extensible substantially homogeneous backing element in long strip form, an adhesive coating on one surface of said backing element including an outer continuous surface of normally tacky and pressure-sensitive adhesive material, and a plurality of relatively strong individual reinforcing strands extending longitudinally of said element and spaced laterally from each other to form a substantially uniform layer, said backing element having a cohesion greater than the adhesion of said outer continuous surface to the back of the preceding convolution when said tape is wound upon itself in roll form, said backing element being sufficiently thin and pliable to permit the transmission of hand pressure through said tape to secure said outer tacky surface to said supporting surfaces, the thickness of said backing element being within the range from about .005 inch to about .025 inch, said strands being embedded in said backing element and retained in their individual positions solely by said backing element in such a manner that said strands are independent of each other and said backing element being sufficiently pliable and extensible to permit individual limited movement of said strands relative to each other while retained in said extensible backing element whereby a tensile stress applied longitudinally to a length of said tape is distributed among said strands.

2. A pressure-sensitive adhesive tape for application to supporting surfaces as set forth in claim 1 wherein said backing element comprises two elongate thin pliable and extensible thermoplastic films disposed in overlying relationship with the strands therebetween, said two films being fused together and fused to said strands to form an integral tape.

3. A pressure-sensitive adhesive tape for application to supporting surfaces as set forth in claim 1 wherein said backing element comprises two elongate thin pliable and extensible layers disposed in overlying relationship with the strands therebetween, said two layers being secured together and secured to said strands to form an integral tape.

4. A pressure-sensitive adhesive tape for application to supporting surfaces comprising an elongate thin pliable and extensible substantially homogeneous backing element in long strip form, an adhesive coating on one surface of said backing element including an outer continuous surface of normally tacky and pressure-sensitive adhesive material, and a plurality of relatively strong individual reinforcing strands extending longitudinally of said element and spaced laterally from each other to form a substantially uniform layer, said backing element having a cohesion greater than the adhesion of said outer continuous surface to the back to the preceding convolution when said tape is wound upon itself in roll form, said backing element being sufficiently thin and pliable to permit the transmission of hand pressure through said tape to secure said outer tacky surface to said supporting surfaces, the thickness of said backing element being within the range from about .005 inch to about .020 inch, said strands being embedded in said backing element and retained in their individual positions solely by said backing element in such a manner that said strands are independent of each other and said backing element being sufficiently pliable and extensible to permit individual limited movement of said strands relative to each other while retained in said extensible backing element whereby a tensile stress applied longitudinally to a length of said tape is distributed among said strands.

5. A pressure-sensitive adhesive tape for application to supporting surfaces comprising an elongate thin pliable and extensible substantially homogeneous backing element in long strip form, an adhesive coating on one surface of said backing element including an outer continuous surface of normally tacky and pressure-sensitive adhesive material, and a plurality of relatively strong individual reinforcing strands extending longitudinally of said element and spaced laterally from each other to form a substantially uniform layer, said backing element having a cohesion greater than the adhesion of said outer continuous surface to the back of the preceding convolution when said tape is wound upon itself in roll form, said backing element being sufficiently thin and pliable to permit the transmission of hand pressure through said tape to secure said outer tacky surface to said supporting surfaces, said backing element comprising polyethylene film having a thickness within the range from about .005 inch to about .025 inch, said strands being embedded in said backing element and retained in their individual positions solely by said backing element in such a manner that said strands are independent of each other and said backing element being sufficiently pliable and extensible to permit individual limited movement of said strands relative to each other while retained in said extensible backing element whereby a tensile stress applied longitudinally to a length of said tape is distributed among said strands.

6. A pressure-sensitive adhesive tape for application to supporting surfaces comprising an elongate thin pliable and extensibile substantially homogeneous backing element in long strip form, an adhesive coating on one surface of said backing element including an outer continuous surface of normaly tacky and pressure-sensitive adhesive material, and a plurality of relatively strong individual reinforcing strands extending longitudinally of said element and spaced laterally from each other to form a substantially uniform layer, said backing element having a cohesion greater than the adhesion of said outer continuous surface to the back of the preceding convolution when said tape is wound upon itself in roll form, said backing element being sufficiently thin and pliable to permit the transmission of hand pressure through said tape to secure said outer tacky surface to said supporting surfaces, said backing element comprising polyethylene film having a thickness within the range from about .005 to .020 inch and said reinforcing strands comprising twenty-four substantially uniformly spaced glass fiber strands per inch of tape width, said strands being embedded in said backing element and retained in their individual positions solely by said backing element in such a manner that said strands are independent of each other and said backing element being sufficiently pliable and extensible to permit individual limited movement of said strands relative to each other while retained in said extensible backing element whereby a tensile stress applied longitudinally to a length of said tape is distributed among said strands.

References Cited in the file of this patent

UNITED STATES PATENTS

| | | |
|---|---|---|
| 1,351,374 | Crowell | Aug. 31, 1920 |
| 2,135,057 | Slayter | Nov. 1, 1938 |
| 2,525,070 | Greenwald | Oct. 10, 1950 |
| 2,572,407 | Talet | Oct. 23, 1951 |
| 2,596,546 | Grimes | May 13, 1952 |
| 2,717,709 | Squires | Sept. 13, 1955 |
| 2,750,030 | Tierney | June 12, 1956 |
| 2,750,315 | Tierney | June 12, 1956 |
| 2,758,342 | Squires | Aug. 14, 1956 |